US011524350B1

(12) United States Patent
Schaeffer et al.

(10) Patent No.: US 11,524,350 B1
(45) Date of Patent: Dec. 13, 2022

(54) BACKWALL STRIKE BRAZE REPAIR

(71) Applicant: General Electric Company, Schenectady, NY (US)

(72) Inventors: Ethan Conrad Schaeffer, Greenville, SC (US); James Scott Flanagan, Simpsonville, SC (US); James J. Murray, III, Mauldin, SC (US); Archie L Swanner, Jr., Easley, SC (US); Logan Tyler Nelson, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/492,760

(22) Filed: Oct. 4, 2021

(51) Int. Cl.
*B23K 1/00* (2006.01)
*B23K 1/008* (2006.01)
*B23K 35/40* (2006.01)
*B23K 1/20* (2006.01)
*G01N 21/954* (2006.01)
*B23P 6/00* (2006.01)
*B33Y 80/00* (2015.01)

(52) U.S. Cl.
CPC ............ *B23K 1/0018* (2013.01); *B23K 1/008* (2013.01); *B23K 1/20* (2013.01); *B23K 35/40* (2013.01); *B23P 6/002* (2013.01); *G01N 21/954* (2013.01); *B33Y 80/00* (2014.12)

(58) Field of Classification Search
CPC ........ B23K 1/0018; B23K 1/008; B23K 1/20; B23K 35/40; B23K 2101/001; B23K 1/0008; B23P 6/002; G01N 21/954; B33Y 80/00

USPC ............................ 228/119; 29/889.1-889.722
See application file for complete search history.

(56) References Cited

U.S. PATENT DOCUMENTS

| 6,199,746 B1 * | 3/2001 | Dupree ................... F01D 5/005 228/119 |
| 6,413,650 B1 | 7/2002 | Dupree et al. |
| 8,087,565 B2 | 1/2012 | Kottilingam et al. |
| 9,248,530 B1 | 2/2016 | Bonini et al. |
| 9,278,462 B2 | 3/2016 | Niblock et al. |
| 10,456,849 B2 | 10/2019 | Eminoglu et al. |
| 2003/0034379 A1 | 2/2003 | Jackson et al. |
| 2009/0165275 A1 | 7/2009 | Cole et al. |
| 2013/0115091 A1 | 5/2013 | Bruck et al. |
| 2013/0323533 A1 | 12/2013 | Cui et al. |

(Continued)

FOREIGN PATENT DOCUMENTS

| CA | 2760250 A1 * | 6/2012 | ........... B23K 26/388 |
| CA | 3038587 A1 * | 12/2019 | ............. B23K 26/02 |

(Continued)

*Primary Examiner* — Kiley S Stoner
(74) *Attorney, Agent, or Firm* — James Pemrick; Charlotte Wilson; Hoffman Warnick LLC

(57) ABSTRACT

A process of repairing a component includes identifying a void in a component; determining at least one approximate physical configuration of the void; inserting borescope into the component in order to view the void; providing a repair rod approximately equivalent to at least one of the least one approximate physical configuration of the void; inserting the repair rod into component; confirming insertion of the repair rod in the void; separating the repair rod to leave a repair plug in the void; and depositing braze paste over the repair plug in the void.

21 Claims, 8 Drawing Sheets

(56) References Cited

U.S. PATENT DOCUMENTS

| | | | |
|---|---|---|---|
| 2014/0076864 A1* | 3/2014 | Kell | B23K 35/365 |
| | | | 362/555 |
| 2015/0328725 A1 | 11/2015 | Wieland et al. | |
| 2016/0001404 A1* | 1/2016 | Mierzejewski | F01D 5/005 |
| | | | 219/69.15 |
| 2016/0199941 A1* | 7/2016 | McDowell | B23K 26/389 |
| | | | 219/121.7 |
| 2016/0199943 A1* | 7/2016 | Hu | B23K 26/146 |
| | | | 219/121.7 |
| 2018/0126499 A1 | 5/2018 | Eminoglu et al. | |
| 2020/0254548 A1 | 8/2020 | Xu et al. | |
| 2021/0060709 A1* | 3/2021 | Thayer | B23K 26/389 |
| 2021/0205910 A1* | 7/2021 | Cui | C22C 19/056 |
| 2021/0220950 A1 | 7/2021 | Thayer et al. | |

FOREIGN PATENT DOCUMENTS

| | | | | | |
|---|---|---|---|---|---|
| CN | 108393648 | A | * | 8/2018 | B23K 1/0018 |
| CN | 113090336 | A | * | 7/2021 | B23K 1/0018 |
| EP | 1074331 | A1 | * | 2/2001 | B23P 6/005 |
| EP | 2008756 | A1 | * | 12/2008 | B23K 26/144 |
| EP | 1803521 | B1 | | 9/2009 | |
| EP | 2623731 | A1 | * | 8/2013 | B23P 6/002 |
| EP | 2949418 | A1 | * | 12/2015 | B23K 26/342 |
| EP | 3042732 | A1 | * | 7/2016 | B23K 26/03 |
| EP | 3059040 | A1 | * | 8/2016 | B23K 26/032 |
| EP | 3059044 | A1 | * | 8/2016 | B23K 26/032 |
| EP | 3747589 | A1 | * | 12/2020 | B23K 1/0018 |
| GB | 2474834 | A | * | 5/2011 | G01N 21/91 |
| GB | 2525410 | A | * | 10/2015 | B23K 26/0096 |
| JP | 2015504499 | A | * | 2/2015 | |
| JP | 2016125499 | A | * | 7/2016 | B23K 26/032 |
| JP | 2021109240 | A | * | 8/2021 | B23K 1/0018 |
| NL | 2013769 | B1 | * | 10/2016 | |
| SE | 1550025 | A1 | * | 7/2015 | |
| SE | 1550035 | A1 | * | 7/2015 | |
| SE | 1550037 | A1 | * | 7/2015 | |
| WO | WO-2013097944 | A1 | * | 7/2013 | B23P 6/002 |

* cited by examiner

BACKWALL STRIKE BRAZE REPAIR

TECHNICAL FIELD

The invention relates generally to gas turbine engines, and, more specifically, to forming holes in gas turbine engine components.

BACKGROUND

In a gas turbine engine, air is pressurized in a compressor and mixed with fuel in a combustor for generating hot combustion gases. Energy is extracted from the gases in a high-pressure turbine (HPT), which powers the compressor, and in a low-pressure turbine (LPT), which powers a fan in a turbofan aircraft engine application or powers an external shaft for marine and industrial applications.

Engine efficiency increases with temperature of combustion gases. However, combustion gases heat various components along their flowpath, which in turn may require cooling thereof to achieve an acceptably long engine lifetime. Typically, the hot gas path components may be cooled by bleeding air from the compressor. This cooling process can reduce engine efficiency, as the bled air is not used in the combustion process.

Gas turbine engine cooling art is mature and has considered various aspects of cooling circuits and features in the various hot gas path components. For example, the combustor may include radially outer and inner liners, which require cooling during operation. Turbine nozzles may include hollow vanes supported between outer and inner bands, which also require cooling. Turbine rotor blades can be hollow and typically include cooling circuits or passages therein, with the blades surrounded by turbine shrouds, which also may require cooling. The hot combustion gases can be discharged through an exhaust, which may also be lined and suitably cooled.

In all of these illustrative non-limiting aspects of gas turbine engine components, thin walls of high strength superalloy metals may be used to reduce component weight and reduce the need for cooling thereof. Various cooling circuits and features can be tailored for these individual components in their corresponding environments in the engine. For example, a series of internal cooling passages, or serpentines, may be formed in a hot gas path component. A cooling fluid may be provided to the serpentines from a plenum, and the cooling fluid may flow through the passages, cooling the hot gas path component substrate and any associated coatings. Holes may be formed to access internal regions within the component.

Electrical discharge machining (EDM) may be used to form cooling holes in a hot gas path component. EDM may result in a backwall strike while drilling/machining to form the cooling holes. Backwall strike occurs when electrode used in EDM extends the hole being drilled/machined further into the component than needed for a desired final hole configuration. The further drilling/machining may be needed to compensate for formation of a recast layer along the surface of an EDM machined part.

A recast layer is a relatively thin surface layer that forms due to the heat of the EDM process. The heat softens areas of the component adjacent to the drilled/machined areas, which reharden after the EDM process is complete. Rehardening may negatively affect a desired configuration of the contour, depth, or construction of the drilled part at the hole being formed. Accordingly, as described hereinafter, and extent to which a hole may be drilled/machined by EDM may be greater than needed in an effort to compensate for recasting. Therefore, as EDM is used to drill/machine through a hot gas path part or component that includes an interior surface of internal cooling passages, backwall strike may occur in or at an interior surface of internal cooling passages. In hot gas path components, backwall strike may generate extended holes in internal cooling passages and may cause structural concerns, such as but not limited to, stress concentrations. Therefore, repair of backwall strike or generated extended hole in internal cooling passages from EDM may avoid stress concentrations in hot gas path parts.

BRIEF DESCRIPTION

All aspects, examples and features mentioned below can be combined in any technically possible way.

An aspect of the disclosure provides a process of repairing a component. The process includes identifying a void in a component; determining at least one approximate physical configuration of the void; inserting borescope into the component in order to view the void; providing a repair rod approximately equivalent to at least one of the least one approximate physical configuration of the void; inserting the repair rod into component; confirming insertion of the repair rod in the void; separating the repair rod to leave a repair plug in the void; and depositing braze paste over the repair plug in the void.

Another aspect of the disclosure includes any of the preceding aspects, and wherein the component is a hot gas path component of a turbomachine.

Another aspect of the disclosure includes any of the preceding aspects, and wherein the void is a backwall strike.

Another aspect of the disclosure includes any of the preceding aspects, and, wherein the backwall strike is formed by EDM of a hole in the hot gas path component.

Another aspect of the disclosure includes any of the preceding aspects, and wherein the determining at least one approximate physical configuration of the void includes determining at least an approximate depth and width of the void.

Another aspect of the disclosure includes any of the preceding aspects, and wherein identifying includes identifying the void using at least one of a borescope or CT scan.

Another aspect of the disclosure includes any of the preceding aspects, and wherein providing the repair rod includes forming the repair rod.

Another aspect of the disclosure includes any of the preceding aspects, and wherein providing the repair rod includes forming a crimp in the repair rod to form a repair plug.

Another aspect of the disclosure includes any of the preceding aspects, and wherein providing the repair rod includes forming by additively manufacturing the repair rod and the repair plug.

Another aspect of the disclosure includes any of the preceding aspects, and wherein additively manufacturing the repair rod and repair plug includes additively manufacturing and forming the crimp.

Another aspect of the disclosure includes any of the preceding aspects, and wherein inserting the repair rod into the void includes inserting the repair rod to a bottom of the void with the plug fully disposed in the void.

Another aspect of the disclosure includes any of the preceding aspects, and wherein separating the repair rod at a top of the void leaves a repair plug in the void with a top of the repair plug disposed at the top of the void.

Another aspect of the disclosure includes any of the preceding aspects, and the process further including disposing braze around the repair plug disposed in the void.

Another aspect of the disclosure includes any of the preceding aspects, and wherein disposing the braze includes at least a plurality of disposing braze steps to build the braze to the top of the void.

Another aspect of the disclosure includes any of the preceding aspects, and further including braze furnace heating the component after disposing braze around the repair plug.

Another aspect of the disclosure includes any of the preceding aspects, and further including repeating deposition of braze after a preceding braze deposition is dried to build up to a nominal internal component surface.

A further aspect of the disclosure provides a process for repairing a backwall strike (BWS) in a hot gas path component. The process comprises identifying a BWS in the hot gas path component; determining at least one physical configuration of the BWS; inserting a borescope into the hot gas path component in order to view the process; providing a repair rod; the repair rod including at least one of an alloy rod and an additively manufactured rod; forming a crimp in the repair rod to form a repair plug; inserting the repair rod and the repair plug into the component; inserting the repair rod and the repair plug into the BWS; inserting the repair plug to a bottom of the BWS; separating the repair rod at the crimp to leave the repair plug in BWS; depositing braze paste over the repair plug in the BWS; and repeating the depositing of braze paste to build braze up to an internal surface of the hot gas path component.

Another aspect of the disclosure includes any of the preceding aspects, and wherein the depositing braze paste over the repair plug includes depositing braze through a diffuser hole in the hot gas path component.

Another aspect of the disclosure includes any of the preceding aspects, and further including heating the hot gas path component in a braze furnace after deposition of braze is complete.

Another aspect of the disclosure includes any of the preceding aspects, and wherein identifying the BWS in the hot gas path component includes identification with at least one of a borescope and CT scan.

Another aspect of the disclosure includes any of the preceding aspects, and wherein inserting the repair rod and the repair plug into the BWS further includes confirming insertion with the least one of a borescope and CT scan.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
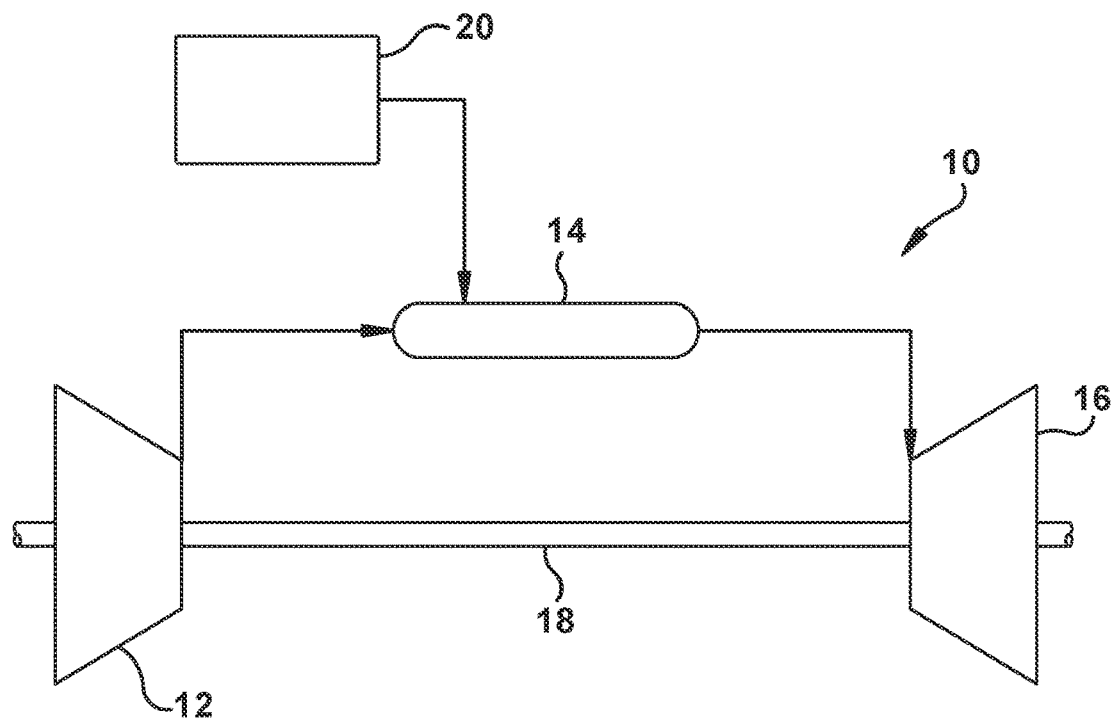
FIG. 1 is a schematic illustration of a gas turbine system according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the subject matter of the current disclosure, it will become necessary to select certain terminology when referring to and describing relevant machine components and repair steps within airfoils. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the turbine's component systems. The term "downstream" corresponds to the direction of flow of the fluid, and the term "upstream" refers to the direction opposite to the flow (i.e., the direction from which the flow originates). The terms "forward" and "aft," without any further specificity, refer to directions, with "forward" referring to the front or compressor end of the engine, and "aft" referring to the rearward section of the turbomachine.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently describe component or element may or may not be present, and that the description includes instances where the event occurs or the component is present and instances where it does not or is not present.

Where an element or layer is referred to as being "on," "engaged to," "connected to" or "coupled to" another element or layer, it may be directly on, engaged to, connected to, or coupled to the other element or layer, or intervening elements or layers may be present. In contrast, when an element is referred to as being "directly on," "directly engaged to," "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Electrical discharge machining (EDM) is a process in which an electrically conductive metal component is shaped by removing material through melting or vaporization by electrical sparks and arcs. EDM may also be called "spark machining" because EDM removes metal by producing a rapid series of repetitive electrical discharges. Spark discharge and transient arc are produced by applying controlled pulsed direct current (DC) between component, often the anode or positively charged, and the tool or electrode, typically the cathode or negatively charged. An end of the electrode and component are separated by a spark gap, such as but not limited to, in a range between about 0.01 millimeters and about 0.50 millimeters. The end of electrode and component are immersed in or flooded by a dielectric fluid. DC voltage enables a spark discharge charge or transient arc to pass between the tool and component. An EDM apparatus may include one or more electrodes for conducting electrical discharges between the electrode and component.

Each spark and/or arc produces enough heat to melt or vaporize a small quantity of the component, thereby leaving a tiny pit or crater in the work surface. This process can be referred to as thermal erosion. In a non-limiting aspect of the embodiments, a cutting pattern of the electrode can be computer numerically controlled (CNC), whereby servomotors control relative positions of the electrode and component. Servomotors can be controlled using relatively complex control algorithms to control spark discharge and control a gap between the tool and component. By immersing the electrode and component in dielectric fluid, a plasma channel can be established between the tool and component to initiate spark discharge. Dielectric fluid may also keep the component's machined area cooled and may also assist removing machining debris. Repetitive discharges create a set of successively deeper craters in the component until the desired shape is produced.

There are two primary EDM methods: ram EDM and wire EDM. One difference between the two methods involves the electrode that is used to perform the machining. In a typical ram EDM application, a graphite electrode is constructed with a specific-shaped and, being connected to a power source and a ram, is slowly fed into the component. The entire machining operation can be usually performed while submerged in a fluid bath. The fluid generally serves at least the following three purposes: 1) flushes material away; 2) serves as a coolant to reduce a heat affected zone (thereby preventing potential component damage); and 3) acts as a conductor after breakdown for current to pass between the electrode and component.

In wire EDM, a very thin wire serves as the electrode. Brass wires may typically be used as an electrode. The wire is slowly fed, and electrical discharges cut the component. Wire EDM also is usually performed in a water bath. The wire itself does not touch the metal to be drilled/machined; the electrical discharges actually remove small amounts of material and allow the wire to be moved through the component. A computer typically controls the wire path via CNC.

EDM may be used effectively to machine hard metals or metal alloys, such as titanium and superalloys. EDM may be cost-effectively used to produce intricate or complex shapes. However, in applications that require a finished product with precise configurations, EDM may not meet all needs. As noted above, EDM includes formation of a recast layer along the surface of an EDM machined part. Recast layer is a relatively thin surface layer that forms due to the heat of the EDM process. Heat softens areas of the machined part adjacent to machined areas, which reharden after the EDM process is complete. Rehardening generally negatively affects a desired configuration of the contour, depth, or construction of the drilled part at the hole being formed.

As a result, to compensate for recasting, an EDM process may form a void, hole, or cavity larger or deeper than that needed to result in the desired hole contour, depth, or construction. Therefore, upon rehardening of the recast layer, the machined/drilled hole is at a desired contour, depth, or construction. However, a recasted layer's amount and extent are not exacting and cannot be calculated precisely. Therefore, EDM may be done to a larger extent than needed to achieve a desired hole contour, depth, or construction. This increased contour, depth, or drilling may not be filled by recast layer(s), and thus a larger hole than desired may be created. In hot gas path parts, EDM may extend past a part of the hot gas part to be drilled and may even extend across internal hot gas path features to other hot gas path component parts, as explained herein. EDM extending to other hot gas path parts and creating a void, hole, or cavity known as a "backwall strike" (hereinafter backwall strike) and repair of a backwall strike may be undertaken.

FIG. 1 is a schematic diagram of a gas turbine system 10. Gas turbine system 10 may include one or more compressors 12, combustors 14, turbines 16, and fuel nozzles 20. One or more shafts 18 may couple the compressor 12 and turbine 16.

Gas turbine system 10 may include a number of hot gas path components 100. As used herein, a hot gas path component is any component of gas turbine system 10 that is at least partially exposed to a high temperature flow of gas through gas turbine system 10. For example, blades or blade assemblies, nozzle assemblies (also known as vanes or vane assemblies), shroud assemblies, transition pieces, retaining rings, and turbine exhaust components are all hot gas path components. However, it should be understood that hot gas path component 100, as embodied by the disclosure, is not limited to the above examples, but may be any component that is at least partially exposed to a flow of high temperature gas. Further, it should be understood that hot gas path component 100 herein is not limited to components in gas turbine systems 10 but may be any piece of machinery or component thereof that may be exposed to high temperature flows.

When hot gas path component 100 is exposed to a hot gas flow, hot gas path component 100 is heated by the hot gas flow and may reach a temperature at which hot gas path component 100 is substantially degraded or fails. To allow gas turbine system 10 to operate with hot gas flow at a high temperature, as required to achieve desired efficiency, performance and/or life of gas turbine system 10, a cooling system for the hot gas path component 100 may be provided.

Figure 2:
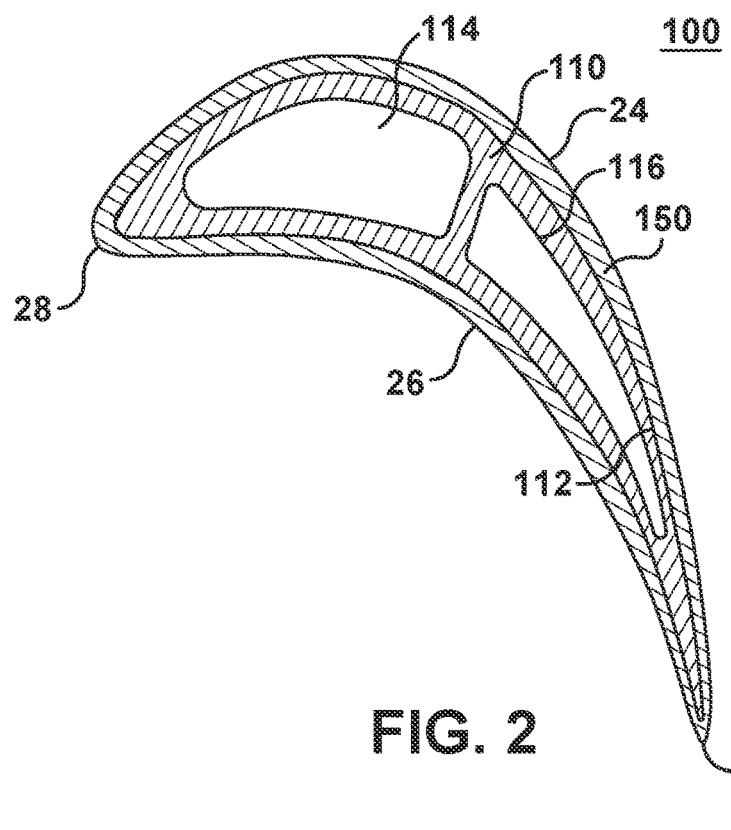
FIG. 2 is a schematic cross-section of an exemplary airfoil configuration according to embodiments of the disclosure.

As in FIG. 2, an illustrative hot gas path component 100 includes a substrate 110 having an outer surface 112 and an inner surface 116. Inner surface 116 defines at least one interior space or cavity 114. For the non-limiting arrangement illustrated in FIG. 2, the outer surface 112 of substrate 110 defines a pressure side wall 24 and a suction side wall 26. In a certain aspect of the embodiments, pressure and suction side walls 24, 26 are connected together at a leading edge 28 and at a trailing edge 30 of hot gas path component 100. Also, in accordance with another aspect of the embodiments in FIG. 2, suction side 26 is convex-shaped and pressure side 24 is concave-shaped.

Figure 3:
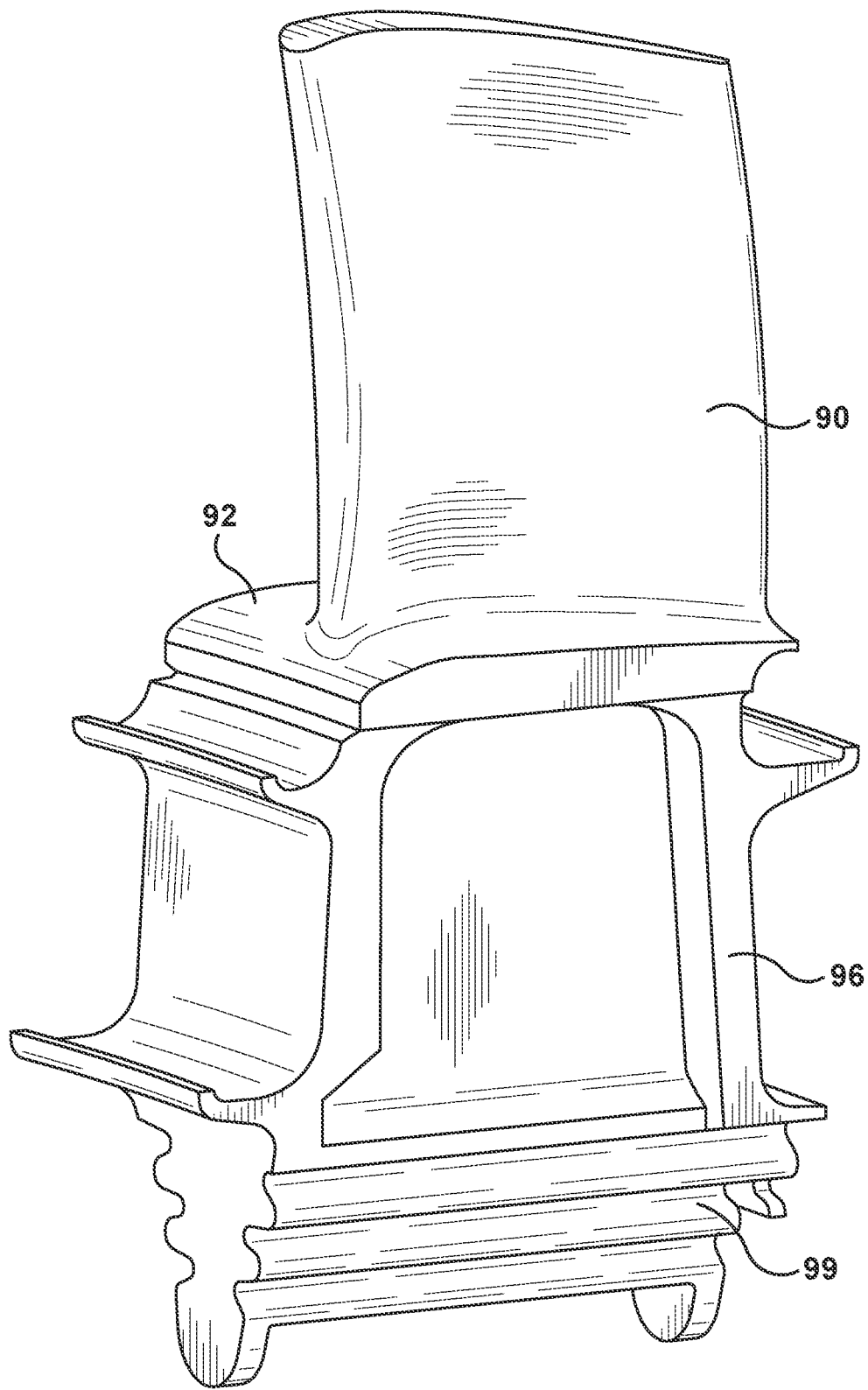
FIG. 3 shows an example hot gas path component with an airfoil, platform, shank, and dovetail according to embodiments of the disclosure.
Figure 4:
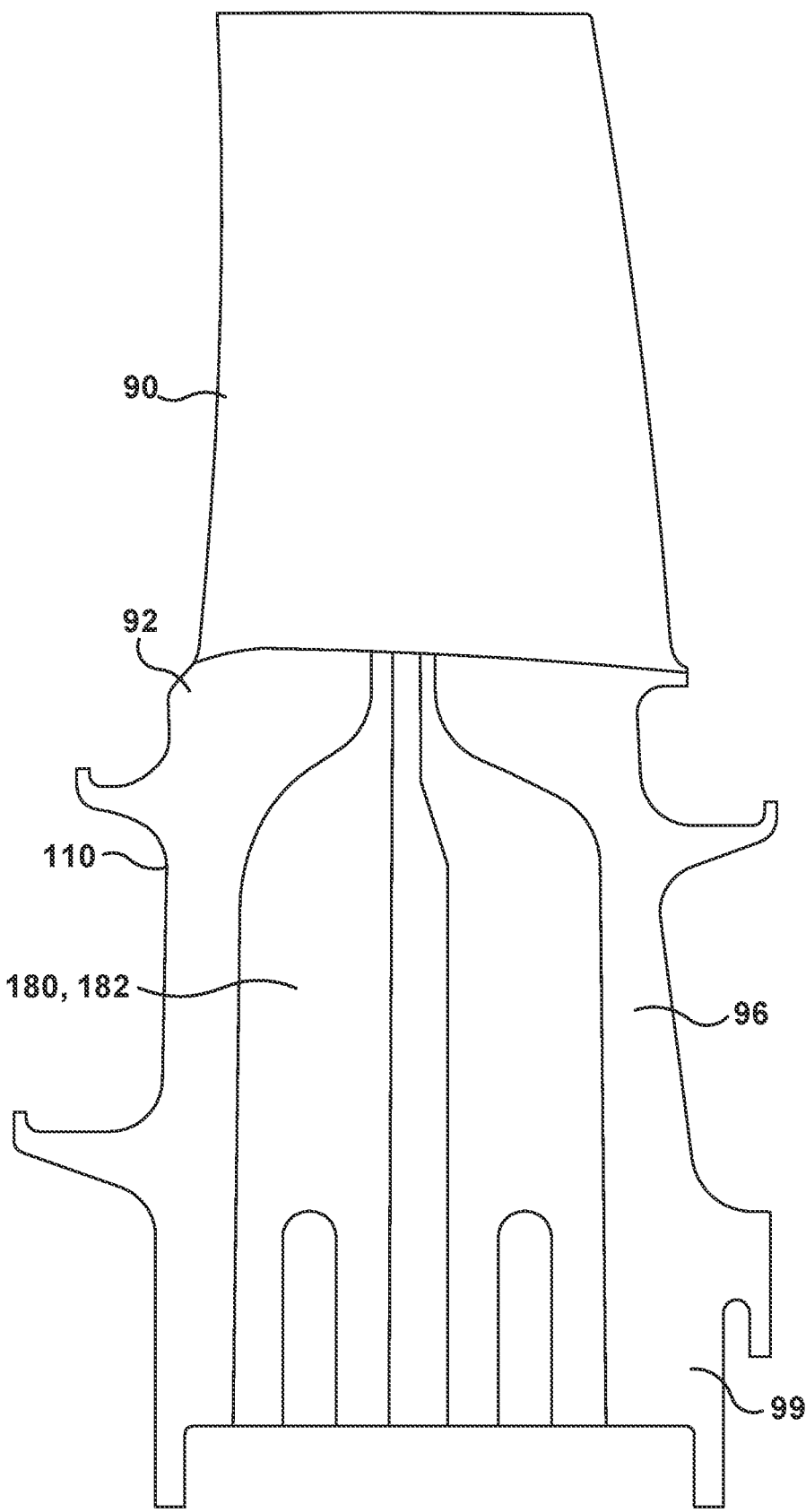
FIG. 4 is a cross-section of the hot gas path component of FIG. 3 with interior spaces of a substrate and passages in the shank and dovetail in an illustrative hot gas path component according to embodiments of the disclosure.

Hot gas path components being machined will vary. In accordance with one aspect of the embodiments, but an illustrative hot gas path component is shown in FIGS. 3 and 4. The illustrative and non-limiting hot gas path component in FIGS. 3 and 4 include a blade with an airfoil 90, platform 92, shank 96, and dovetail 99. Dovetail 99 includes passages 180, 182 that extend through dovetail 99 through shank 96 and platform 92 and lead up to airfoil 90. Passages 180, 182 may allow cooling fluid to flow into and through interior spaces or cavities 114 of airfoil 90. Further, a coating 150 can be applied over at least a portion of the outer surface 112 of the substrate 110. Coating 150 may be a thermal barrier coating system of suitable materials and may be bonded to component 110 by a bond coat of coating 150.

Referring now to FIG. 5-9, creating and repairing a backwall strike will now be discussed. As embodied by the disclosure at least one hole 140 can be formed in and through substrate 110. Each at least one hole 140 (FIG. 8) may lead into to at least one of interior spaces or cavities 114. In an aspect of the embodiments, the at least one hole 140 can be a diffuser hole 240. Diffuser hole 240 may also be known as and referred to as a "film cooling hole."

Each diffuser hole 240 is provided in hot gas path component 100. Each at least one diffuser hole 240 may be formed proximate leading edge 28 of hot gas path component 100. Further, each at least one diffuser hole 240 can be configured to provide fluid communication with at least one of the interior spaces or cavities 114 through diffuser passage 242.

As embodied by the disclosure, each diffuser hole 240 may be formed using a drilling process. In one aspect of the embodiments, drilling processes may include electrical discharge machining (EDM). However, other aspects of the embodiments may include other drilling processes for forming holes 140 and 240, either alone or in combination with EDM. Holes 140, 240 that may be formed via EDM may alternatively be formed by other known drilling processes, such as but not limited to, laser drilling, abrasive liquid jet (ALJ) drilling, or any other drilling process now known or hereinafter developed.

Figure 5:
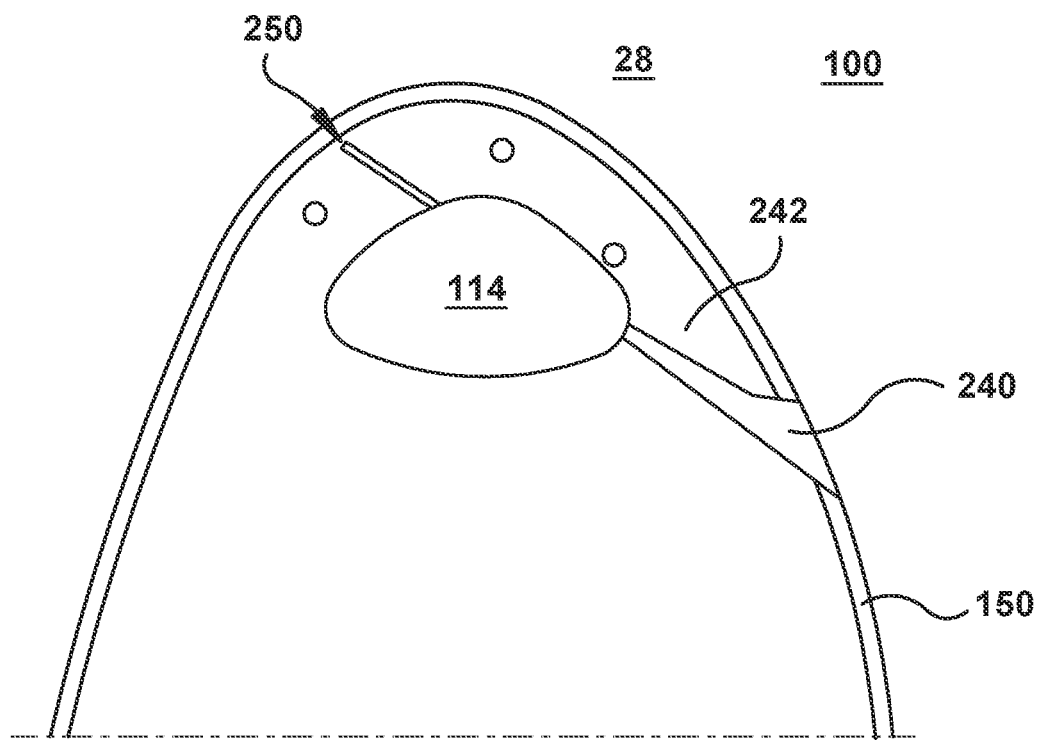
FIG. 5 illustrates a cross sectional view of an illustrative hot gas path component as an airfoil configuration proximate a leading edge with diffuser holes formed by electrode discharge machining (EDM) and a backwall strike according to embodiments of the disclosure.
Figure 6:
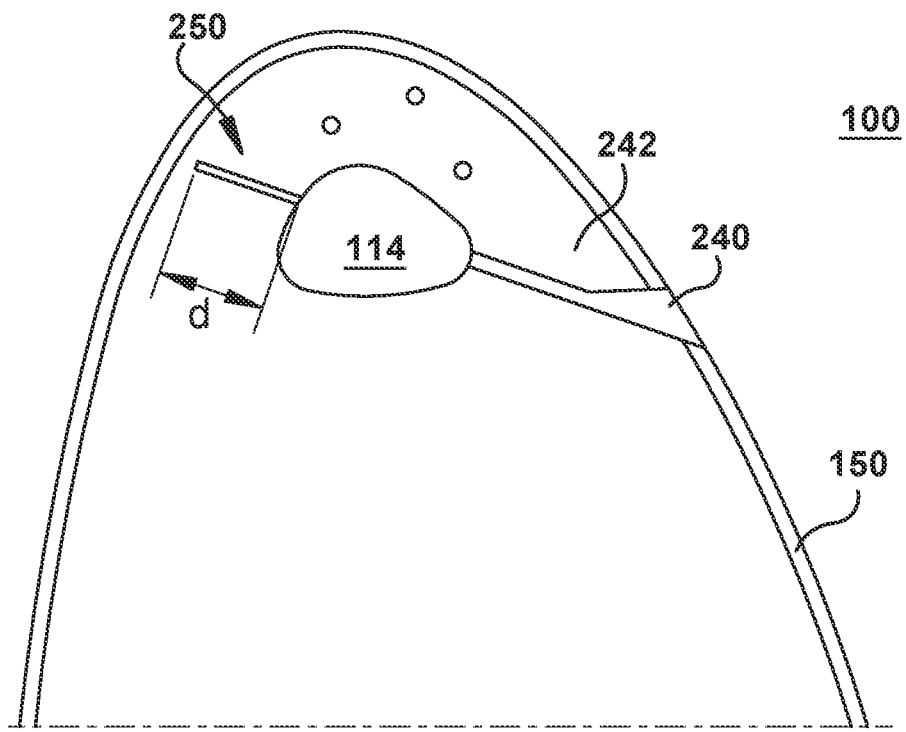
FIG. 6 illustrates a cross sectional view of a further illustrative hot gas path component as an airfoil configuration proximate the leading edge with diffuser holes formed by EDM and a backwall strike according to embodiments of the disclosure.

FIGS. 5 and 6 illustrate a backwall strike in substrate 110 that results from EDM and overcompensating for creation of a recast layer in the EDM processes forming diffuser hole 240. In the EDM process of forming a diffuser hole 240, the EDM electrode may also drill and create a diffuser cooling passage 242. In an aspect of the embodiments, diffuser cooling passage 242 extends through substrate 110 to at least one of the interior spaces or cavities 114. However, even with stringent controls of EDM processing, an electrode may contact a backwall of at least one of the interior spaces or cavities 114. When an electrode contacts a backwall of at least one of the interior spaces or cavities 114 there may be contact. Contact at a backwall by an EDM electrode may result, in some situations, as a backwall strike or an alteration (hereinafter "backwall strike") substrate 110 at the point of electrode-backwall contact. A backwall strike in substrate 110 may cause stress concentrations in substrate 110, which may be undesirable. Thus, addressing backwall strikes in substrate 110 to mitigate any stress concentration concerns may be undertaken.

Depending on the intended application for component 100, component 100 could include Ni-base, Co-base and Fe-base superalloys. The Ni-base superalloys may be those containing both γ and γ' phases, particularly those Ni-base superalloys containing both γ and γ' phases wherein the γ' phase occupies at least 40% by volume of the superalloy. Such alloys are known to be advantageous because of a combination of desirable properties including high temperature strength and high temperature creep resistance. The substrate material may also comprise a NiAl intermetallic alloy, as these alloys are also known to possess a combination of superior properties including high-temperature strength and high temperature creep resistance that are advantageous for use in turbine engine applications used for aircraft.

Figure 8:
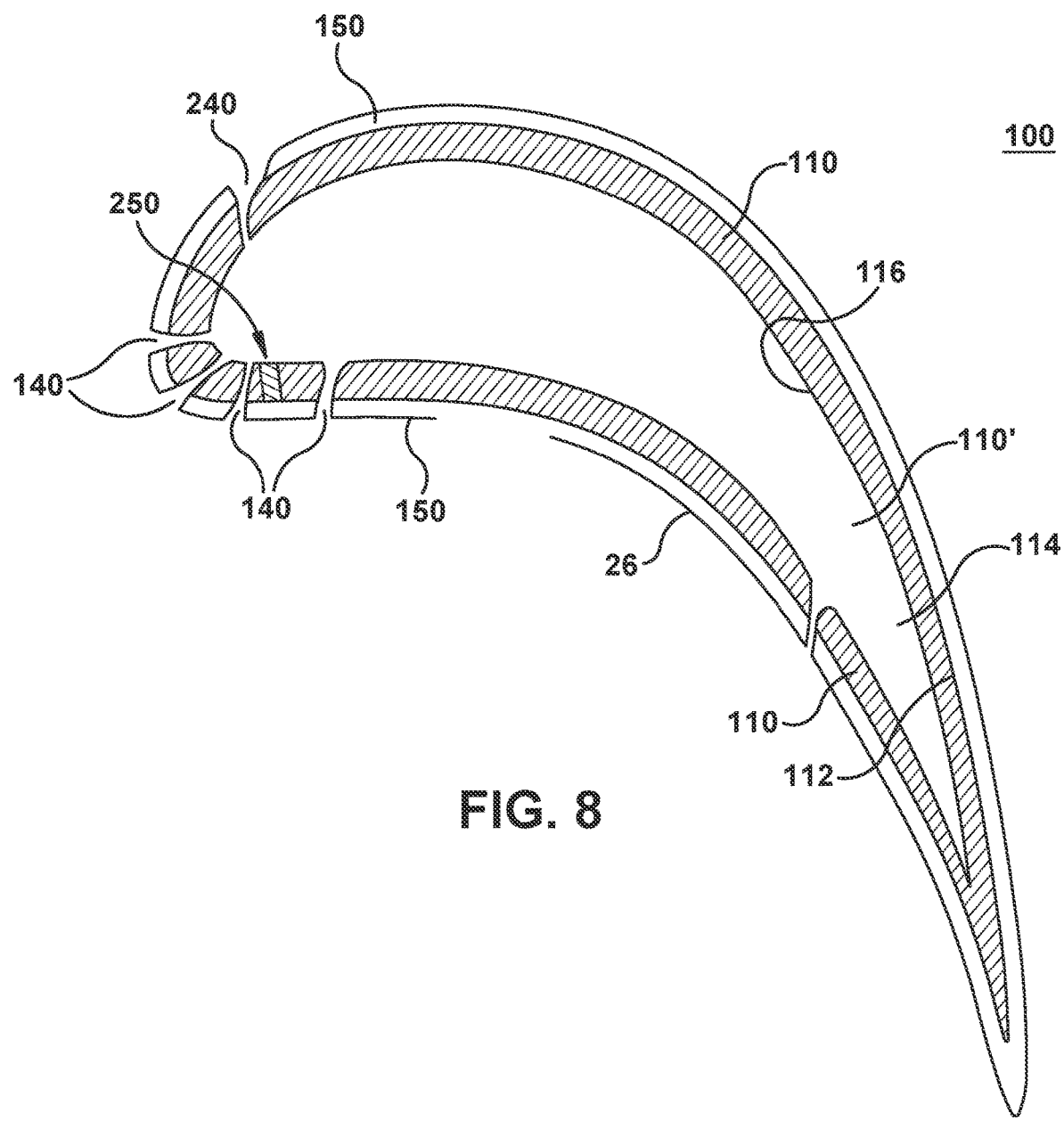
FIG. 8 is a schematic cross-section of a repaired backwall strike in an exemplary airfoil configuration with exemplary cooling holes according to embodiments of the disclosure.

For the non-limiting airfoil configuration shown in FIG. 8, the holes 240 are diffuser holes, and as embodied by the disclosure diffuser holes 240 may have different shapes. Additionally, formation and repair processes as embodied by the disclosure may be used to provide backwall strike protection when forming a variety of holes, in addition to diffuser holes 240 described above with reference to the figures. For example, holes may comprise one or more of passive cooling holes, blade tip dust holes, purge holes, airfoil trailing edge holes, film slots, sealing holes, sealing slots, endwall/platform/shroud/tip-shroud perimeter holes, and combinations thereof.

Backwall strike protection may be provided near trailing edge 28 of airfoil 90. The repair of backwall strike can be provided there as a distance between opposing walls of substrate 110 may be short and thus control EDM without recasting is challenging. Thus, if EDM drilling of diffuser hole 240 and diffuser passage diffuser cooling passage 242 is ceased before creating appropriate hole and passage configurations, diffuser hole 240 and/or diffuser cooling passage 242 may not be sufficiently created in size, width, and/or length to enable appropriate cooling of a hot gas path component.

With reference to FIGS. 5 and 6, two orientations variations of diffuser hole 240 and diffuser passage 242 are illustrated. As illustrated, angles vary at which diffuser hole 240 and diffuser passage 242 enter into substrate 110. Angles at which diffuser hole 240 and diffuser passage 242 enter into substrate 110 vary depending on a desired film cooling effect for the component 100, as embodied by the disclosure.

Backwall strike 250 is illustrated at the extension of the diffuser passage 242. As discussed above, an EDM electrode enters into substrate 110, and in order to ensure appropriate configuration of diffuser passage 242 during EDM, the EDM electrode may extend further into interior spaces or cavities 114. If the EDM electrode, to ensure appropriate creation of diffuser passage 242, extends too far into interior spaces or cavities 114, EDM electrode may strike backwall and create backwall strike 250. As noted above, a backwall strike 250 may create undesirable stressing in substrate 110 and remediation or repair may be undertaken preferred.

Figure 7:
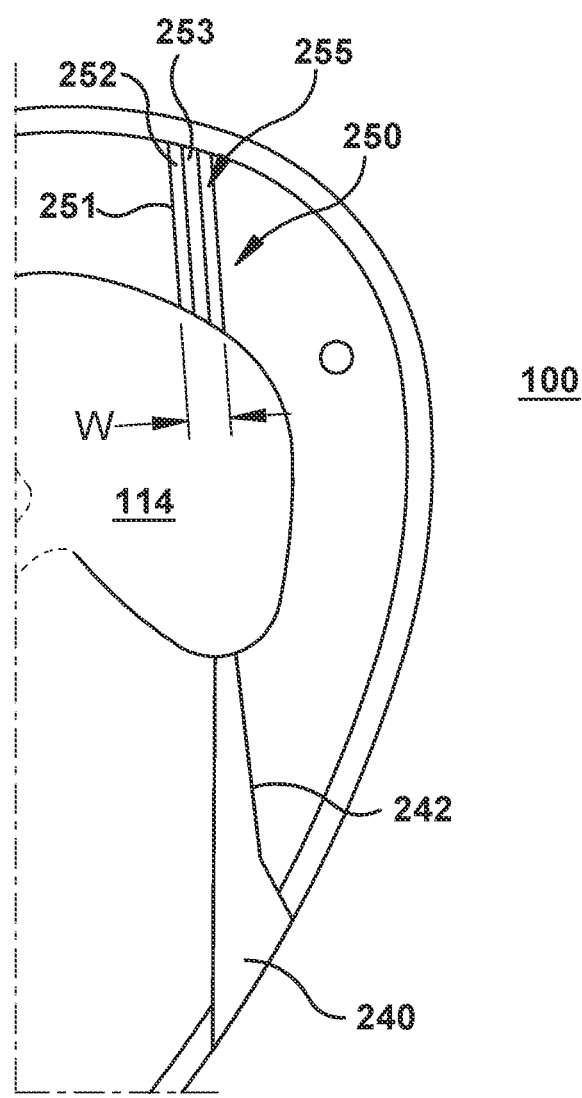
FIG. 7 illustrates a cross sectional view of a repaired backwall strike in an illustrative hot gas path component as an airfoil configuration proximate the leading edge with diffuser holes according to embodiments of the disclosure.
Figure 9:
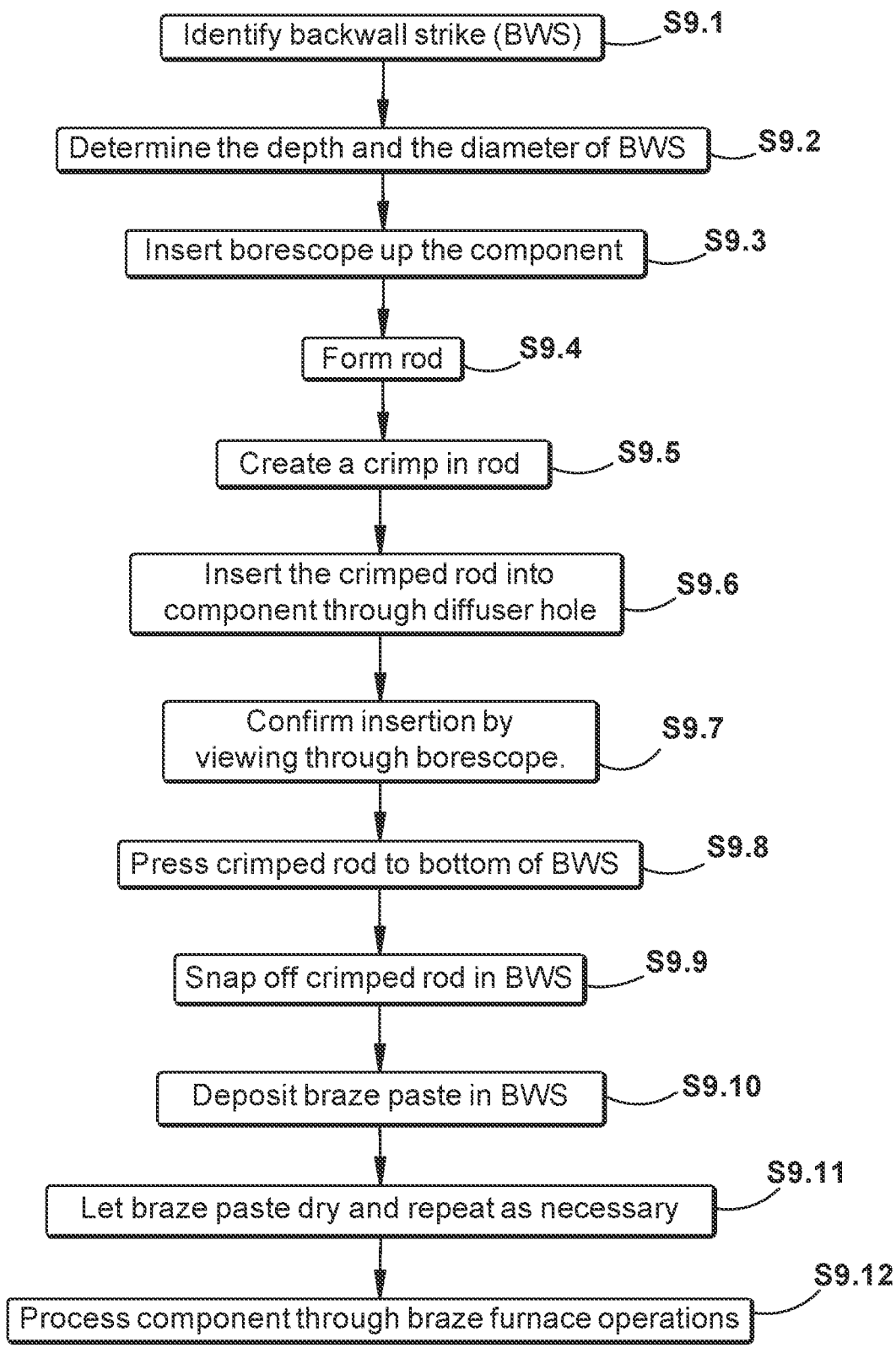
FIG. 9 is a flowchart of a repair backwall strike process for a component according to embodiments of the disclosure.
Figure 10:
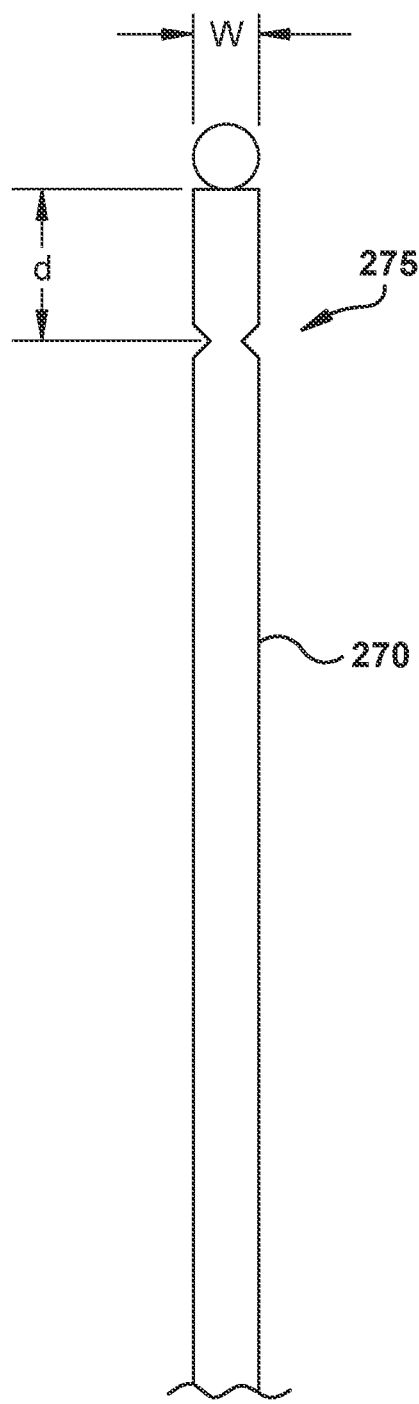
FIG. 10 is a schematic representation of a rod used for repairing a backwall strike, according to embodiments of the disclosure.

FIGS. 7 and 8 illustrate a repaired backwall strike 250 in accordance with aspects of the embodiment. FIG. 9 is a flow chart of the repair process of a backwall strike 250, as embodied by the disclosure. FIG. 10 is a schematic representation of a rod used for repairing a backwall strike. With reference to FIGS. 7-10, a non-limiting repair process for a back wall strike will now be described.

A repair process of backwall strike 250 first identifies a backwall strike in Step 1. In certain aspects of the embodiment, a backwall strike 250 in a hot gas path component that is an airfoil 90 may be identified through use of a borescope that will be inserted from the dovetail 99 of the airfoil 90 through interior spaces or cavities 114. Alternatively, and in another non-limiting aspect of the embodiments, a CT scan maybe used to identify a backwall strike 250 in the hot gas path component.

Repair process continues in Step 2 to determine an approximate physical configuration of backwall strike 250. Elements of the configuration of backwall strike 250 include, but are not limited to depth d, diameter or width w, and perimeter 251 of backwall strike 250. The configuration determination of Step 2 may employ the same tools employed in Step 1, the identification tools, such as but not limited to, a borescope or CT scan.

In Step 3, if a borescope was not used to identify the backwall strike in Step 1, a borescope is then inserted up through the hot gas path component. The borescope that is now inserted into the component can be employed to view and monitor backwall strike repair, as embodied by the disclosures.

Once the configuration of backwall strike 250 has been determined, an appropriate weld rod or alloy rod 270 (FIGS. 7 and 8) can be created or provided (Step 4). As embodied by the disclosure, weld rod or alloy rod 270 includes a portion to form plug 253. The selection of the rod 270 is done to match as close as possible to the configuration of backwall strike 250. In other words, rod 270 should have a shape and/or size corresponding to at least one of the physical configurations of the backwall strike 250. Thus, plug 253, when formed, can substantially coincide with at least one of the determined approximate depth, diameter, width, and perimeter 251 configuration of backwall strike 250.

As embodied by the disclosure, one embodiment of weld rod or alloy rod 270 (herein after "rod 270") may include a portion to form a plug 253. Rod 270 (FIG. 10) includes plug 253 formed therein and selected to closely match with the diameter and width of backwall strike 250. Plug 253 and rod 270 may be selected (Step 4.1) from multiple rods, and the particular rod 270 may have a diameter may closely match the diameter of backwall strike 250.

In a further aspect of the embodiments, rod 270 and plug 253 may be an additively manufactured plug 253. By additively manufacturing rod 270 and plug 253 (Step 4.2), rod 270 and plug 253 may be customized and fit closely in backwall strike 250. Additionally, in an aspect of the embodiments, additive manufacturing rod 270 and plug 253 may be useful if backwall strike 250 configurations has a complex and/or irregular geometry. Technical advantages of additively manufacturing rod 270 and plug 253 is a reduction of inventory, customized and precise rod 270 and plug 253 configurations, and ability to adapt the additively manufacturing rod 270 and plug 253 to the particular material needs of the hot gas path component 100.

Once an appropriate rod 270 and plug 253 are determined, either as an alloy rod 270 and plug 253 or an additively manufactured rod 270 and plug 253, and made, a crimp 275 is formed in the rod 270 (Step 4.3). Crimp 275 is provided at distance d from an end of rod 270 to form plug 253. Distance d on rod 270 from crimp 275 matches depth d of backwall strike 250. Accordingly, when rod 270 and plug 253 are inserted into backwall strike 250, crimp 275 will lie approximately at surface of interior spaces or cavities 114 at backwall strike 250. Crimp 275 can be formed in rod 270 before entering hot gas path component 100. A tool, such as but not limited to crimping tool, can be used to form crimp 275 in rod 270. If rod 270 is additively manufactured, crimp 275 can be additively formed in rod 270.

Rod 270 and plug 253, as embodied by the disclosure as either a rod or an additively manufactured plug, are then inserted (Step 5) into hot gas path component 100 through diffuser hole 420. Confirmation of insertion (Step 5) of rod 270 and plug 253 into the backwall strike 250 may be verified (Step 6) by the borescope, which was inserted into component 100 at Step 3. Insertion continues until plug 253 is inserted fully into backwall strike 250 (Step 7) where plug will abut an end wall of backwall strike 250. Confirmation in Step 6 may be verified by a borescope that is provided in hot gas path component 100, in either Step 1 or Step 3.

After rod 270 and plug 253 have been fully inserted into the backwall strike 250 (Step 7), the portion of rod 270 extends out of backwall strike 250, such as into interior spaces or cavities 114. Portion of rod 270 that extends out of backwall strike 250 is separated from plug 253 disposed in backwall strike 250. Portion of rod 270 that extends out of backwall strike 250 can be separated by fracturing plug 253 at crimp 275. Breaking at crimp 275, in certain aspects of the embodiment, may include snapping off the portion of rod 270 that extends out of backwall strike 250 using resistance, torque, or other such means. Since crimp 275 creates a weakened zone in rod 270, fracture at crimp 275 would require a force that is less than that needed to fracture rod 270 at areas other than crimp 275. At this point plug 253 may have a pointed end where crimped end remains in the back wall strike.

Braze 252 (FIG. 7) is then deposited around over plug 253 in backwall strike 250. In accordance with certain aspects of the invention, braze 252 may be deposited using a syringe and needle assembly. Braze 252 paste having sufficient viscosity to extend into voids 255 between plug 253 and perimeter 251 of backwall strike 250 may be provided. Braze 252 can be deposited over and around plug 253 in backwall strike 250. Braze 252 can be added by subsequent deposits if needed to build up to an internal component configuration, preferably co-linear and co-planar with surface 114 of hot gas path component 100. Once braze 252 is built up to an appropriate and desired amount, as confirmed by borescope, repair process of can be continued, which would typically include braze furnace operations. Thus, braze 252 will solidify and complete the repair process of backwall strike 250 so hot gas pass component 100 should have any stress is caused by EDM mitigated.

As used herein, "approximately" indicates +/−10% of the value, or if a range, of the values stated.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A process of repairing a component, the process comprising:
   identifying a void in the component;
   determining at least one approximate physical configuration of the void;
   inserting a borescope into the component in order to view the void;
   providing a repair rod approximately equivalent to the at least one approximate physical configuration of the void;
   inserting the repair rod into the void;
   confirming insertion of the repair rod in the void;
   separating the repair rod to leave a repair plug in the void; and
   depositing a braze paste over the repair plug in the void.

2. The process of claim 1, wherein the component is a hot gas path component of a turbomachine.

3. The process of claim 2, wherein the void is a backwall strike.

4. The process of claim 3, wherein the backwall strike is formed by EDM of a hole in the hot gas path component.

5. The process of claim 1, wherein the determining at least one approximate physical configuration of the void includes determining at least an approximate depth and width of the void.

6. The process of claim 1, wherein identifying includes identifying the void using at least one of a borescope or CT scan.

7. The process of claim 1, wherein providing the repair rod includes forming the repair rod.

8. The process of claim 1, wherein providing the repair rod includes forming a crimp in the repair rod to form a repair plug.

9. The process of claim 8, wherein providing the repair rod includes forming by additively manufacturing the repair rod and the repair plug.

10. The process of claim 8, wherein additively manufacturing the repair rod and repair plug includes additively manufacturing and forming the crimp.

11. The process of claim 1, wherein inserting the repair rod into the void includes inserting the repair rod to a bottom of the void with the plug fully disposed in the void.

12. The process of claim 11, wherein separating the repair rod at a top of the void leaves a repair plug in the void with a top of the repair plug disposed at the top of the void.

13. The process of claim 12, the process further including disposing braze around the repair plug disposed in the void.

14. The process of claim 13, wherein disposing the braze includes at least a plurality of disposing braze steps to build the braze to the top of the void.

15. The process of claim 14, further including braze furnace heating the component after disposing braze around the repair plug.

16. The process of claim 1, further including repeating deposition of braze after a preceding braze deposition is dried to build up to a nominal internal component surface.

17. A process for repairing a backwall strike (BWS) in a hot gas path component, the process comprising:
   identifying a BWS in the hot gas path component;
   determining at least one physical configuration of the BWS;
   inserting a borescope into the hot gas path component in order to view the process;
   providing a repair rod; the repair rod including at least one of an alloy rod and an additively manufactured rod;
   forming a crimp in the repair rod to form a repair plug;
   inserting the repair rod and the repair plug into the component;
   inserting the repair rod and the repair plug into the BWS;
   inserting the repair plug to a bottom of the BWS;
   separating the repair rod at the crimp to leave the repair plug in BWS;
   depositing braze paste over the repair plug in the BWS; and
   repeating the depositing of braze paste to build braze up to an internal surface of the hot gas path component.

18. A process for repairing a backwall strike (BWS) in a hot gas path component of claim 17, wherein the depositing braze paste over the repair plug includes depositing braze through a diffuser hole in the hot gas path component.

19. A process for repairing a backwall strike (BWS) in a hot gas path component of claim 17, further including heating the hot gas path component in a braze furnace after deposition of braze is complete.

20. A process for repairing a backwall strike (BWS) in a hot gas path component of claim 17, wherein identifying the BWS in the hot gas path component includes identification with at least one of a borescope and CT scan.

21. A process for repairing a backwall strike (BWS) in a hot gas path component of claim 17, wherein inserting the repair rod and the repair plug into the BWS further includes confirming insertion with the least one of a borescope and CT scan.

\* \* \* \* \*